(12) United States Patent
Farrell et al.

(10) Patent No.: US 10,926,962 B2
(45) Date of Patent: Feb. 23, 2021

(54) FLEXIBLE FEEDING TRAY AND SYSTEM FOR SINGULATING BULK OBJECTS

(71) Applicant: Raytheon Company, Waltham, MA (US)

(72) Inventors: Justin V. Farrell, Stratham, NH (US); Christopher A. Robbat, Medford, MA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/295,675

(22) Filed: Mar. 7, 2019

(65) Prior Publication Data
US 2020/0283240 A1    Sep. 10, 2020

(51) Int. Cl.
  *B65G 47/24* (2006.01)
  *B65G 47/02* (2006.01)
  *B65G 47/14* (2006.01)

(52) U.S. Cl.
  CPC .... *B65G 47/1421* (2013.01); *B65G 2201/047* (2013.01)

(58) Field of Classification Search
  None
  See application file for complete search history.

(56) References Cited

U.S. PATENT DOCUMENTS

| 1,495,610 | A | | 5/1924 | Paridon |
| 3,301,378 | A | * | 1/1967 | Wayne et al. ........ A23G 7/0037 198/383 |
| 3,567,007 | A | | 3/1971 | Maeda |

(Continued)

FOREIGN PATENT DOCUMENTS

| CN | 102092567 B | 7/2012 |
| CN | 108750598 A | 11/2018 |

(Continued)

OTHER PUBLICATIONS

Asycube 530, Asyril Datasheet Flexible Feeding System (Jul. 2017).

(Continued)

*Primary Examiner* — Kavel Singh
(74) *Attorney, Agent, or Firm* — Renner, Otto, Boisselle & Sklar, LLP

(57) ABSTRACT

A flexible feeding system including a tray configured to orient, segregate and singulate objects. The tray is operatively coupled to a multi-directional vibratory platform for causing movement of the objects in multiple different directions on the tray. The tray includes an orienting region having orienting slots for orienting the objects, and a divider that separates the orienting region from a singulating region of the tray. The divider includes openings that correspond with the orienting slots. The openings are configured to permit the objects which are oriented in the slots to pass across the divider into the singulating region, while restricting the misoriented objects from passing across the divider. The tray may include an upstream bulk region for containing a plurality of the objects in bulk form. The tray also may include a downstream pick region for confining the oriented objects at predetermined locations in each of the slots.

15 Claims, 8 Drawing Sheets

(56) References Cited

U.S. PATENT DOCUMENTS

| | | | | |
|---|---|---|---|---|
| 4,146,123 | A | * | 3/1979 | Cottrell ............. B65G 47/1421 198/382 |
| 4,933,074 | A | | 6/1990 | Fuller, Jr. et al. |
| 5,489,019 | A | | 2/1996 | DiNanno et al. |
| 5,913,428 | A | | 6/1999 | Graham |
| 5,960,929 | A | * | 10/1999 | Graham ............. B65G 47/1421 198/380 |
| 6,006,890 | A | * | 12/1999 | Crawford ........... B65G 47/1492 193/46 |
| 8,550,233 | B2 | | 10/2013 | Perroud |
| 8,707,132 | B2 | * | 4/2014 | Nakagawa ............. G06K 15/40 714/763 |
| 8,708,132 | B2 | * | 4/2014 | Kelly .................... A23N 15/00 198/418 |
| 9,463,935 | B1 | | 10/2016 | Karpinsky et al. |
| 9,499,328 | B2 | | 11/2016 | Daniels et al. |
| 2002/0115401 | A1 | * | 8/2002 | Kobussen ........... A22C 11/008 452/51 |
| 2002/0155401 | A1 | * | 10/2002 | Yamaguchi ........ G03C 1/49845 430/620 |
| 2010/0063629 | A1 | | 3/2010 | Battisti |
| 2010/0133066 | A1 | | 6/2010 | Bassini |
| 2011/0011882 | A1 | | 6/2011 | Kirby et al. |
| 2015/0066200 | A1 | | 3/2015 | McCarthy et al. |

FOREIGN PATENT DOCUMENTS

| | | |
|---|---|---|
| DE | 202014102070 U1 | 5/2014 |
| JP | 2006335481 A | 12/2006 |
| JP | 2007217039 A | 8/2007 |

OTHER PUBLICATIONS

International Search Report and Written Opinion for corresponding International Application PCT/US2020/021331 dated Jun. 4, 2020.

* cited by examiner

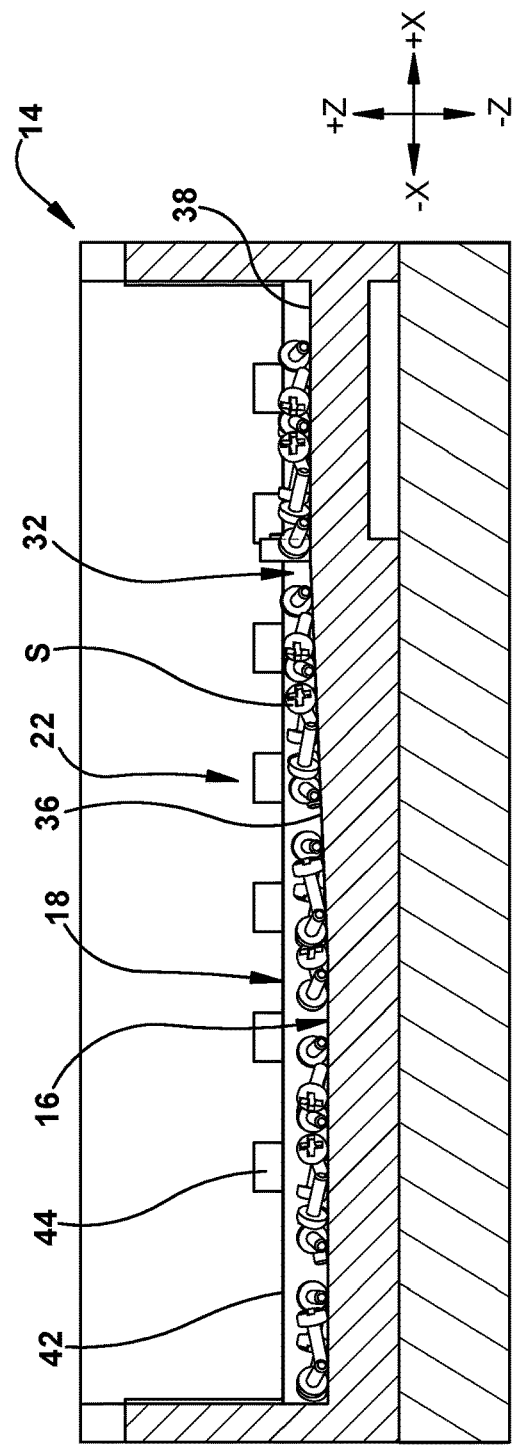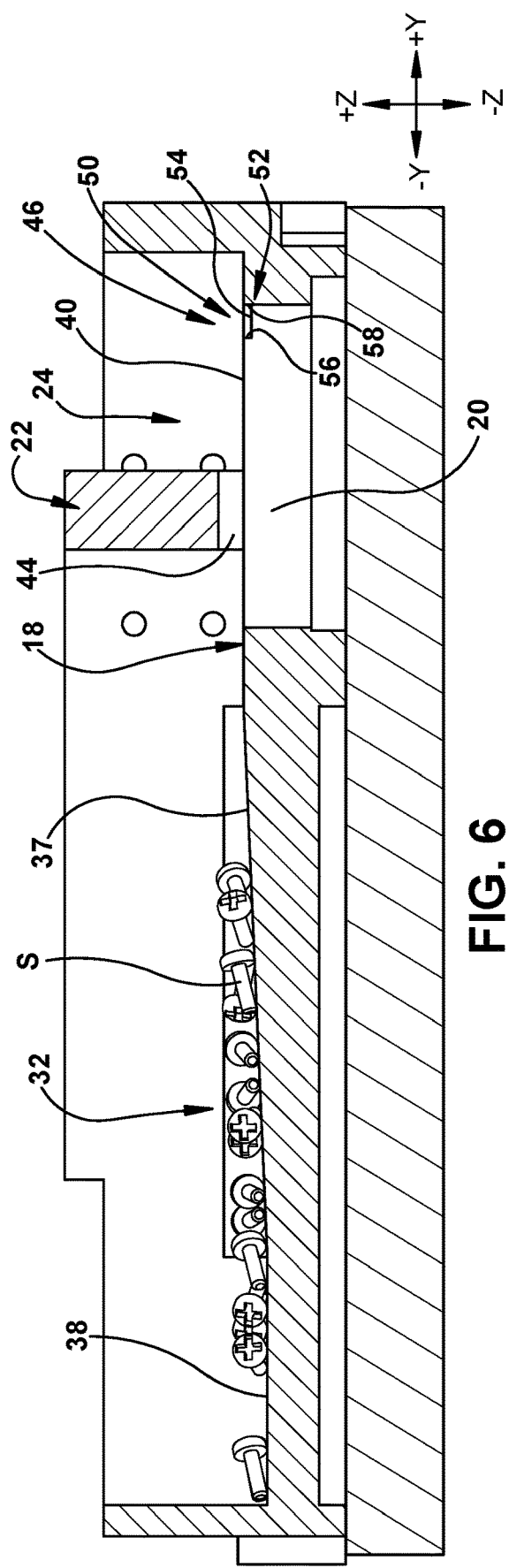
FIG. 5
FIG. 6

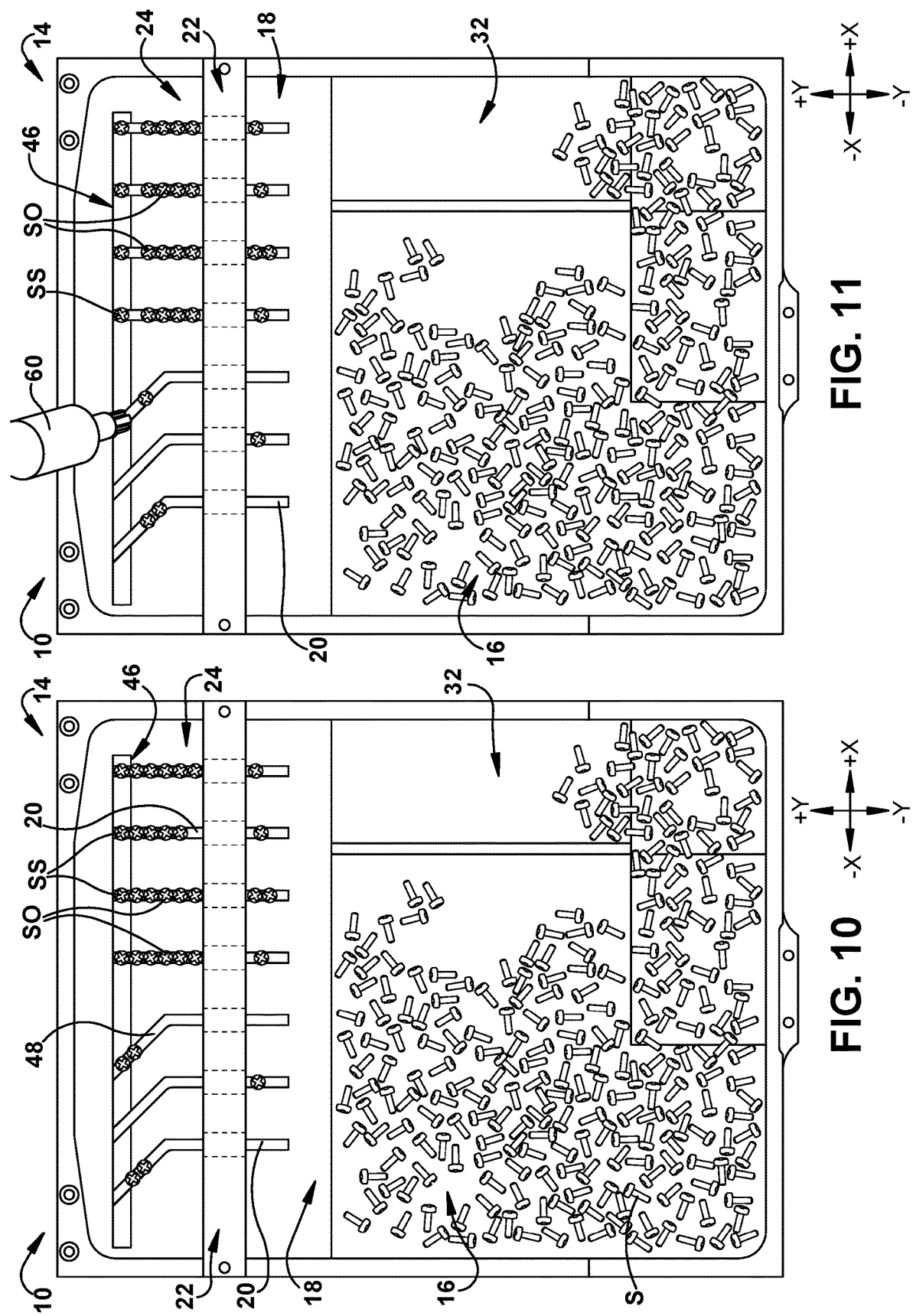

FLEXIBLE FEEDING TRAY AND SYSTEM FOR SINGULATING BULK OBJECTS

TECHNICAL FIELD

The present invention relates generally to flexible feeding systems such as for use in an assembly process, and more particularly to a tray of a flexible feeding system for orienting and singulating bulk objects.

BACKGROUND

Feed systems for bulk objects such as fasteners are common in fixed automation processes. However, such systems are often hard-tooled only for a specific type of fastener and are inflexible.

Flexible feeding systems are relatively new to the market with the aim of providing enhanced flexibility in properly orienting and picking objects such as fasteners. Typically such systems include an external hopper for bulk storage of the objects, a vibration table that receives a quantity of the bulk objects from the hopper and uses vibration to orient and/or singulate the objects, and a vision-guided system including a robot that locates and picks the objects from the table one at a time.

SUMMARY

At least one problem with conventional flexible feeding systems of the type described above is that misoriented and oriented objects are often commingled together on the vibration table, which can obstruct the robot from picking up only the oriented objects. In addition, such conventional systems require complicated external vision-guided systems and algorithms for locating and picking only the objects that are properly oriented amid the other misoriented objects.

An aspect of the present invention provides a flexible feeding system that segregates oriented objects from misoriented objects, and singulates the oriented objects for improving the picking of the objects.

More particularly, according to an aspect of the present invention, a flexible feeding system is provided that includes a vibratory platform operatively coupled to a unique tray having one or more orientation slots configured to orient the objects within the slots, and a divider that is configured to permit the oriented objects in the slots to pass across the divider, while restricting passage of the misoriented objects that are not oriented in the slots. The tray may include an upstream bulk region for containing a plurality of the objects in bulk form. The tray also may include a downstream pick region for confining and singulating the oriented objects at predetermined locations in each of the slots. The tray also may be removable from the vibratory platform to facilitate quick changeover of the tray, such as for use with different types of objects.

According to an aspect of the invention, a flexible feeding system includes: a multi-directional vibratory platform; a tray operatively coupled to the vibratory platform, the tray comprising: a bulk region configured to contain a plurality of objects in bulk form; an orienting region having one or more orienting slots configured to orient one or more of the objects within each of the one or more slots; and a divider that separates the orienting region from a singulating region of the tray; wherein the one or more orienting slots extend across the divider from the orienting region into the singulating region of the tray; and wherein the divider includes one or more openings that correspond with the one or more orienting slots, the one or more openings being configured to permit the objects which are oriented and singulated in series in the one or more orienting slots to pass across the divider into the singulating region, and the divider being configured to restrict the objects which are misoriented in the orienting region from passing across the divider into the singulating region.

According to an embodiment of any paragraph(s) of this summary, the one or more orienting slots are configured to receive a lower portion of each of the objects when oriented, such that an upper portion of each of the objects which are oriented protrudes above the one or more orienting slots; and wherein each of the one or more openings of the divider are configured to permit the upper portions of the objects which are oriented in the one or more orienting slots to pass across the divider.

According to an embodiment of any paragraph(s) of this summary, the one or more orienting slots are formed as recesses in a support surface of the tray, the one or more orienting slots being configured to receive the lower portion of each of the objects which are oriented, and the support surface being configured to support the upper portion of each of the objects which are oriented.

According to an embodiment of any paragraph(s) of this summary, a width of each of the one or more openings is wider than a width of each the corresponding one or more orienting slots.

According to an embodiment of any paragraph(s) of this summary, the divider is fixed in position relative to the orienting region.

According to an embodiment of any paragraph(s) of this summary, the bulk region is recessed in the tray at a lower elevation than the orienting region.

According to an embodiment of any paragraph(s) of this summary, the tray further includes a feed region connecting the bulk region to the orienting region, the feed region being upwardly inclined from the bulk region to the orienting region.

According to an embodiment of any paragraph(s) of this summary, the orienting region includes a ledge between the one or more orienting slots and the bulk region, such the objects which are misoriented can move toward the bulk region and pass over the ledge to fall into the bulk region.

According to an embodiment of any paragraph(s) of this summary, the tray further includes a pick region downstream of the singulating region; wherein the one or more orienting slots extend through the singulating region to the pick region; and wherein the pick region includes one or more one-way stops that correspond with each of the one or more orienting slots, the one or more one-way stops being configured to permit the objects which are oriented in the one or more orienting slots to pass across the respective one-way stops in a downstream direction, and to restrict said objects from passing back across the one-way stop in an opposite upstream direction.

According to an embodiment of any paragraph(s) of this summary, the pick region includes one or more recessed areas that correspond with each of the one or more orienting slots, the one or more recessed areas being at an elevation below an elevation of the singulating region, and wherein the one or more recessed areas form respective one or more ledges that define the one or more one-way stops; and wherein each of the one or more recessed areas has an axial length along each of the one or more slots that is sufficient to contain only a single one of the objects in each of the one or more slots.

According to an embodiment of any paragraph(s) of this summary, the tray is removable from the vibratory platform; and wherein the tray has a fastener configured to be received in a receiver of the vibratory platform to secure the tray to the vibratory platform; or the tray has a receiver configured to receive a fastener of the vibratory platform to secure the tray to the vibratory platform.

According to an embodiment of any paragraph(s) of this summary, the multi-directional vibratory platform is operatively coupled to a controller that is configured to drive one or more actuators of the vibratory platform that causes movement of the objects from the bulk region downstream to the orienting region and across the divider into the singulating region.

According to another aspect of the invention, a tray for being operatively coupled to a vibratory platform of a flexible feeding system includes: an orienting region configured to receive a plurality of unoriented objects, the orienting region having one or more orienting slots configured to orient one or more of the unoriented objects within each of the one or more slots; a divider that separates the orienting region from a singulating region of the tray; wherein the one or more orienting slots extend beyond the divider from the orienting region into the singulating region of the tray; and wherein the divider includes one or more openings that correspond with the one or more orienting slots, the one or more openings being configured to permit the objects which are oriented in the one or more slots to pass across the divider into the singulating region, and the divider being configured to restrict the objects which are unoriented in the orienting region from passing across the divider into the singulating region.

According to an embodiment of any paragraph(s) of this summary, the one or more orienting slots are configured to orient and singulate the objects in series within each of the one or more orienting slots, and are configured to guide the objects which are oriented and singulated in series along each of the one or more orienting slots across the divider into the singulating region.

According to an embodiment of any paragraph(s) of this summary, the tray further includes a pick region downstream of the singulating region, and the one or more orienting slots extend through the singulating region to the pick region; and wherein the pick region includes one or more recessed areas that correspond with each of the one or more orienting slots, each of the one or more recessed areas forming opposing abutments along each of the one or more orienting slots, the respective opposing abutments being configured to contain only a single one of the objects in each of the one or more orienting slots.

According to another aspect of the invention, a method for singulating objects from bulk includes: disposing a plurality of objects in a bulk region of a tray that is operatively coupled to a vibratory platform; driving one or more actuators of the vibratory platform to move the objects on the tray, the driving the one or more actuators including the steps of: driving the one or more actuators in a direction that causes the objects to move from the bulk region of the tray to an orienting region of the tray having one or more orienting slots, such that one or more of the objects orient in the one or more orienting slots; driving the one or more actuators in a direction that causes the objects to move toward a divider that separates the orienting region from a singulating region of the tray, wherein the divider permits the objects which are oriented in the one or more orienting slots to pass across the divider into the singulating region, and wherein the divider restricts the objects which are misoriented in the orienting region from passing across the divider into the singulating region; and driving the one or more actuators in a direction that causes the objects to move toward a pick region of the tray.

According to an embodiment of any paragraph(s) of this summary, the one or more orienting slots extend through the singulating region to the pick region, the pick region including one or more one-way stops that correspond with each of the one or more orienting slots, the one or more one-way stops being configured to permit the objects which are oriented in the one or more orienting slots to pass across the respective one-way stops in a downstream direction, and to restrict said objects from passing back across the one-way stop in an opposite upstream direction; and the method further comprising: moving the objects beyond the one or more one-way stops to confine respective ones of the objects in each of the one or more orienting slots at predetermined locations in the pick region.

According to an embodiment of any paragraph(s) of this summary, after the objects enter the orienting region, the method further including a step of: moving the objects in a direction opposite the direction toward the divider, such that the objects which are not in the slots are caused to move over a ledge and fall into the bulk region.

According to an embodiment of any paragraph(s) of this summary, the method further includes a step of: using a robot to pick the objects when they have reached the pick region.

According to an embodiment of any paragraph(s) of this summary, the method further includes a step of: using a sensor to count the number of the objects in at least one region of the tray, and feeding additional objects onto the tray when the number of the objects on the tray is below a predetermined number.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

FIG. 5 is a cross-sectional front view taken about the line 5-5 in FIG. 4.

FIG. 6 is a cross-sectional side view taken about the line 6-6 in FIG. 4.

FIG. 10 is a top plan view of the system and tray in an exemplary state in which the oriented objects are advanced to a pick region of the tray.

FIG. 11 is a top plan view of the system and tray in an exemplary state in which the direction of the objects is reversed away from the pick region, and showing an exemplary picking of one of the objects by a tool.

DETAILED DESCRIPTION

The principles and aspects of the present disclosure have particular application to flexible feeding systems such as for use with fasteners in an assembly process, and thus will be described below chiefly in this context. It is understood, however, that principles and aspects according to the present disclosure may be applicable to other flexible feeding systems for other types of objects, such as where it is desirable to improve singulation of bulk objects by segregating oriented objects from misoriented objects.

Figure 1:
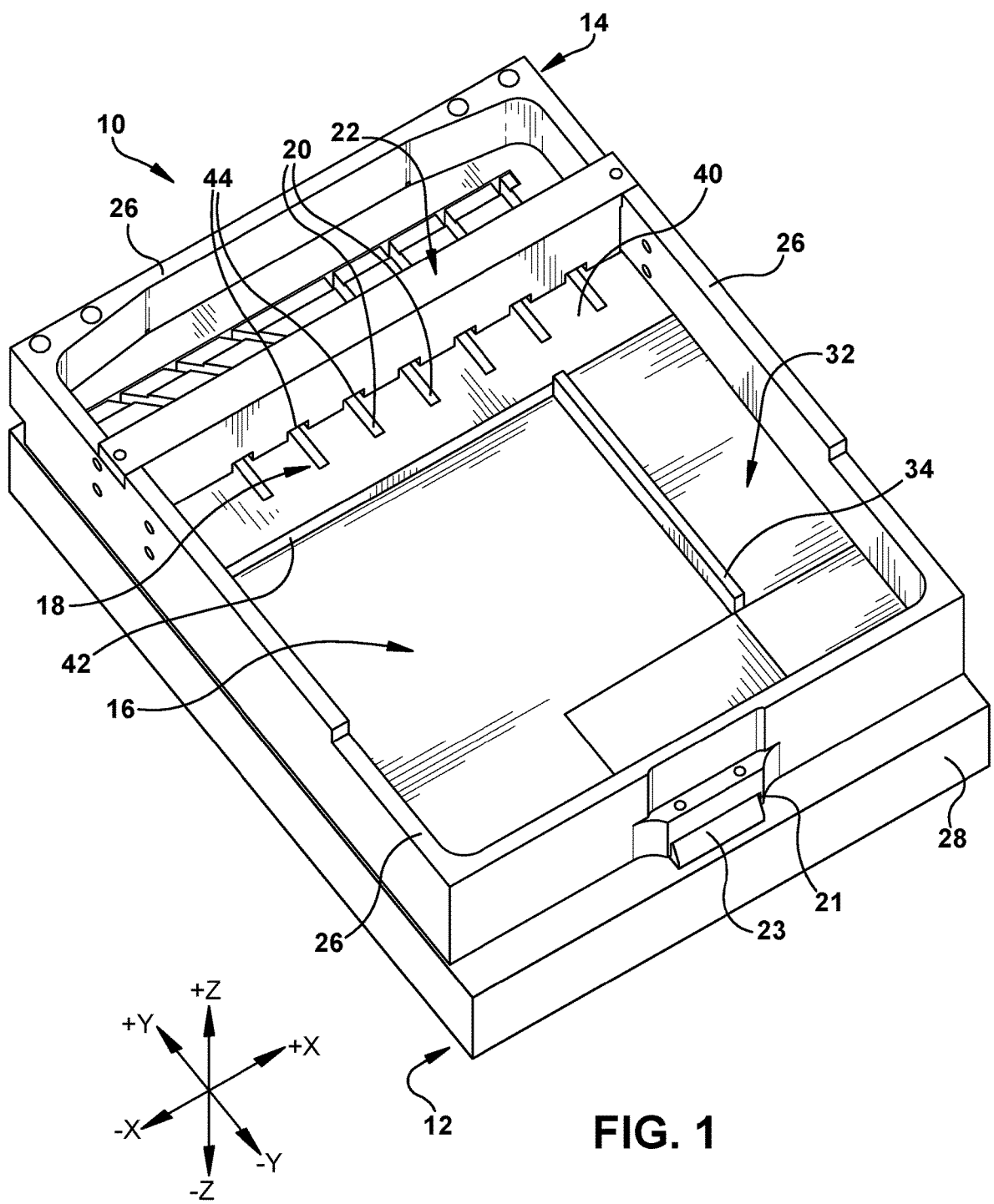
FIG. 1 is a perspective view of an exemplary flexible feeding system including an exemplary tray according to an embodiment of the present invention.
Figure 2:
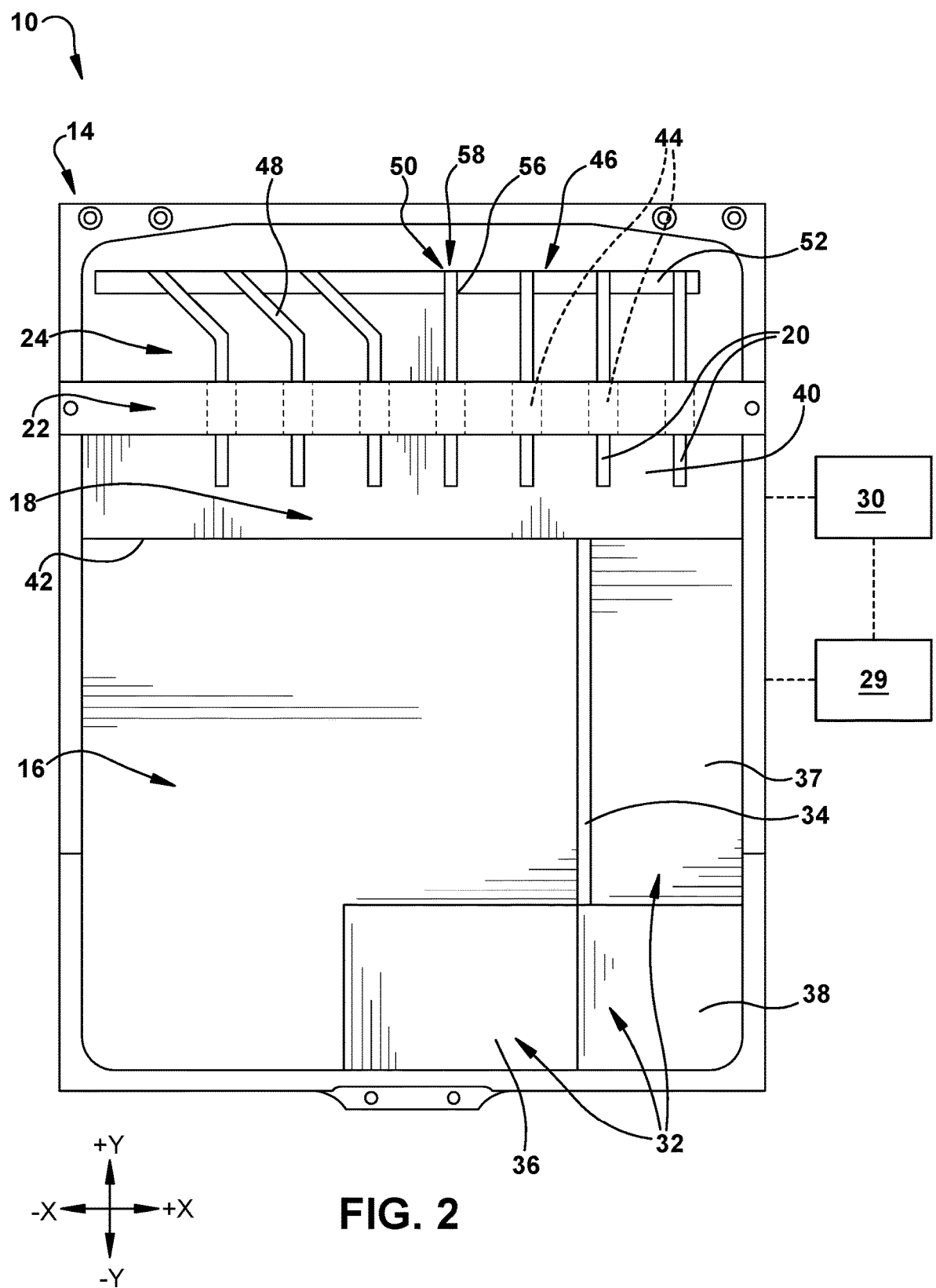
FIG. 2 is a top plan view of the system and tray.

Referring initially to FIGS. 1 and 2, an exemplary flexible feeding system 10 is shown including a multi-directional vibratory device 12 and an exemplary tray 14 operatively coupled in vibratory communication with the vibratory device 12. As shown, the tray 14 generally includes a bulk region 16 configured to contain a plurality of objects in bulk form, an orienting region 18 having one or more orienting slots 20 configured to orient one or more of the objects within each of the one or more slots, and a divider 22 that separates the orienting region 18 from a singulating region 24 of the tray 14. As described in further detail below, the one or more orienting slots 20 extend across the divider 22 from the orienting region 18 into the singulating region 24 of the tray, and the divider 22 is configured to permit objects that are oriented in the slots 20 to pass to the singulating region 24 while restricting objects that are misoriented from passing thereacross. In this manner, the divider 22 segregates objects that are oriented from objects that are misoriented, thereby facilitating singulation of the objects and improving presentation of the objects for being picked from the tray 14.

In exemplary embodiments, the flexible feeding system 10 may be utilized in a manufacturing process, such as in an assembly process that utilizes the objects in an assembly. For example, the objects may be fasteners, such as screws, bolts, or the like, in which it is desirable to locate and pick the objects quickly and precisely for increasing efficiency in the manufacturing process. The exemplary flexible feeding system 10 thus provides a manufacturing solution at the point of assembly that can be provided quickly and inexpensively. In addition, the tray 14 may be removable or reconfigurable to accommodate production changes, such as when there is a need to different types of fasteners, for example. To facilitate quick changeover of the tray, the tray 14 may include a receiver 21, such as a catch or other suitable receiver, that is configured to receive a corresponding fastener 23, such as a latch or other suitable fastener, of the vibratory platform 12. Alternatively, the tray 14 may include the fastener and the vibratory platform 12 may include the receiver.

As shown, the tray 14 includes upright sidewalls 26 that contain the objects to inside of the tray. Also as shown, the different parts of the exemplary tray 14 may be fixed in position relative to each other with no moving parts. Instead, the system 10 may use vibration caused by the vibratory device 12 to move the objects across the different fixed regions of the tray 14, as will be described in further detail below.

In exemplary embodiments, the vibratory device 12 includes a vibratory platform 28 having a plurality of vibration generators (e.g., vibrators or actuators) (not shown) that provide two, three, four, five or six degree of freedom functionality. For example, the vibration generators may be capable of vibrating the tray 14 in one of three directions (x, y, z), and/or also may be capable of vibrating the tray 14 in directions corresponding to any combination of the three directions x, y and z. Each of the vibrating actuators may include a stationary element mounted on a frame (not shown), in which a vibrating element of the actuator is movably mounted relative to the stationary element and connected to a vibrating support. In exemplary embodiments, the vibration generator is of the piezoelectric, electromagnetic, pneumatic or hydraulic type. In addition, the system may include a power source 29 and a controller 30 (shown schematically in FIG. 2) which is configured to control the vibration generators with a frequency, amplitude and/or desired direction. An example of such a vibratory device is described in further detail in U.S. Pat. No. 8,550,233, which is incorporated herein by reference in its entirety.

Figure 3:
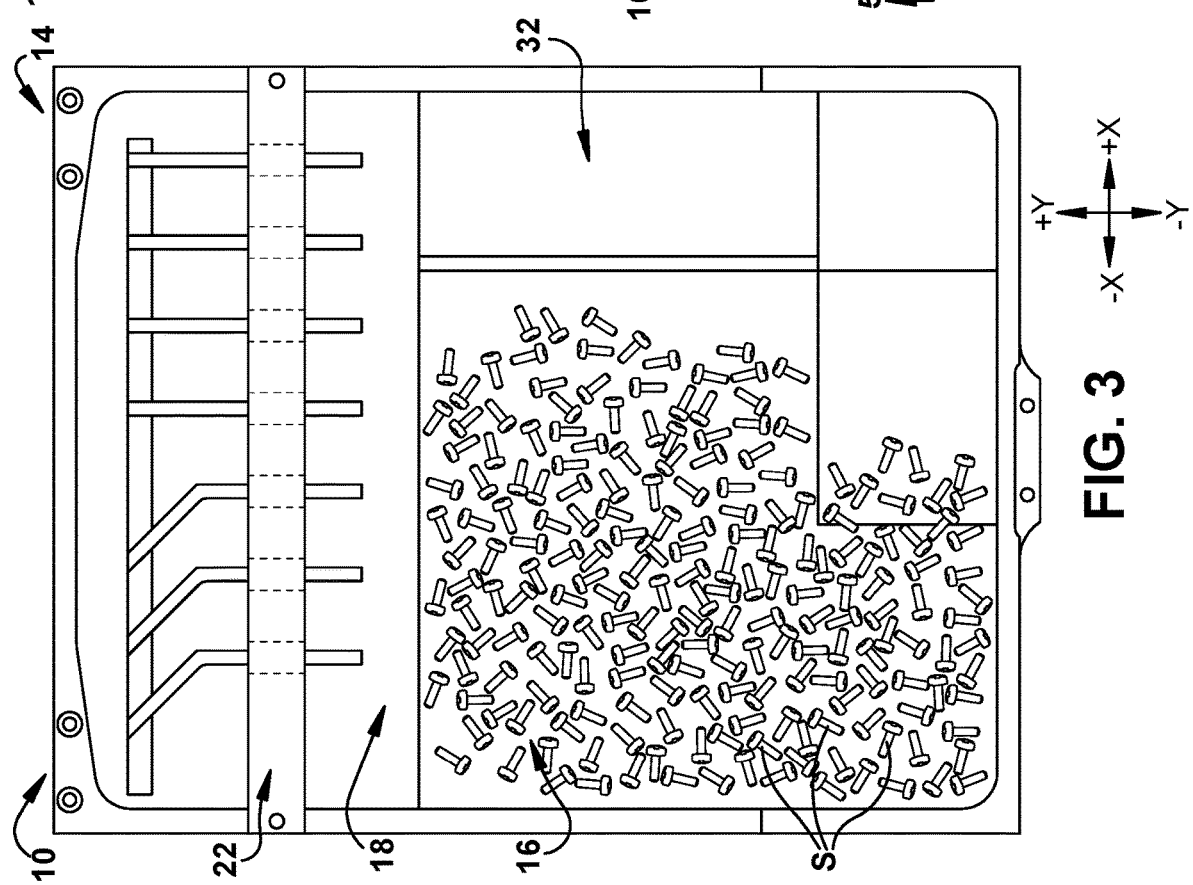
FIG. 3 is a top plan view of the system and tray in an exemplary state containing bulk objects in a bulk region of the tray.

Referring to FIG. 3, the bulk region 16 of the tray is configured to contain the objects in bulk form (e.g., in a relatively large quantity with no particular orientation, as shown with exemplary reference to the objects "S," for example). In such embodiments, providing the bulk region 16 within the walls 26 of the tray 14 may reduce or eliminate the need for an external hopper for feeding objects S to the tray. Instead, a bulk quantity of such objects S for use with a desired number of assembly units all may be contained within a single tray 14, for example. It is understood, however, that in some embodiments an external hopper may be utilized with the tray 14 for feeding objects S to the bulk region 16 and/or directly feeding the orienting region 18, as may be desirable for particular applications.

As shown in the illustrated embodiment, the bulk region 16 may be recessed below one or more of the other regions of the tray 14, and may be at the lowest elevation of the tray 14. Such recessing of the bulk region 16 may enable the objects S to be gravity fed back into the bulk region 16, such as when the vibrational movement from the vibratory device 12 is terminated. Alternatively or additionally, such recessing of the bulk region 16 may facilitate clearing away of misoriented objects from the orienting region 18, as will be discussed in further detail below. In addition, the recessing of the bulk region 16 may help to restrict easy travel of the objects to the orienting region 18 absent specific vibration instructions, which may help to prevent the objects from crowding into the orienting region 18. In exemplary embodiments, the bulk region 16 may be devoid of recesses, protrusions or other surface effects that could otherwise impede the flow of the objects from the bulk region 16. It is understood, however, that in some embodiments the bulk region 16 may be on the same plane as the other regions, and/or the one or more actuator(s) (e.g., vibrators) of the vibratory platform 12 may drive the objects S back toward the bulk region 16.

Figure 4:
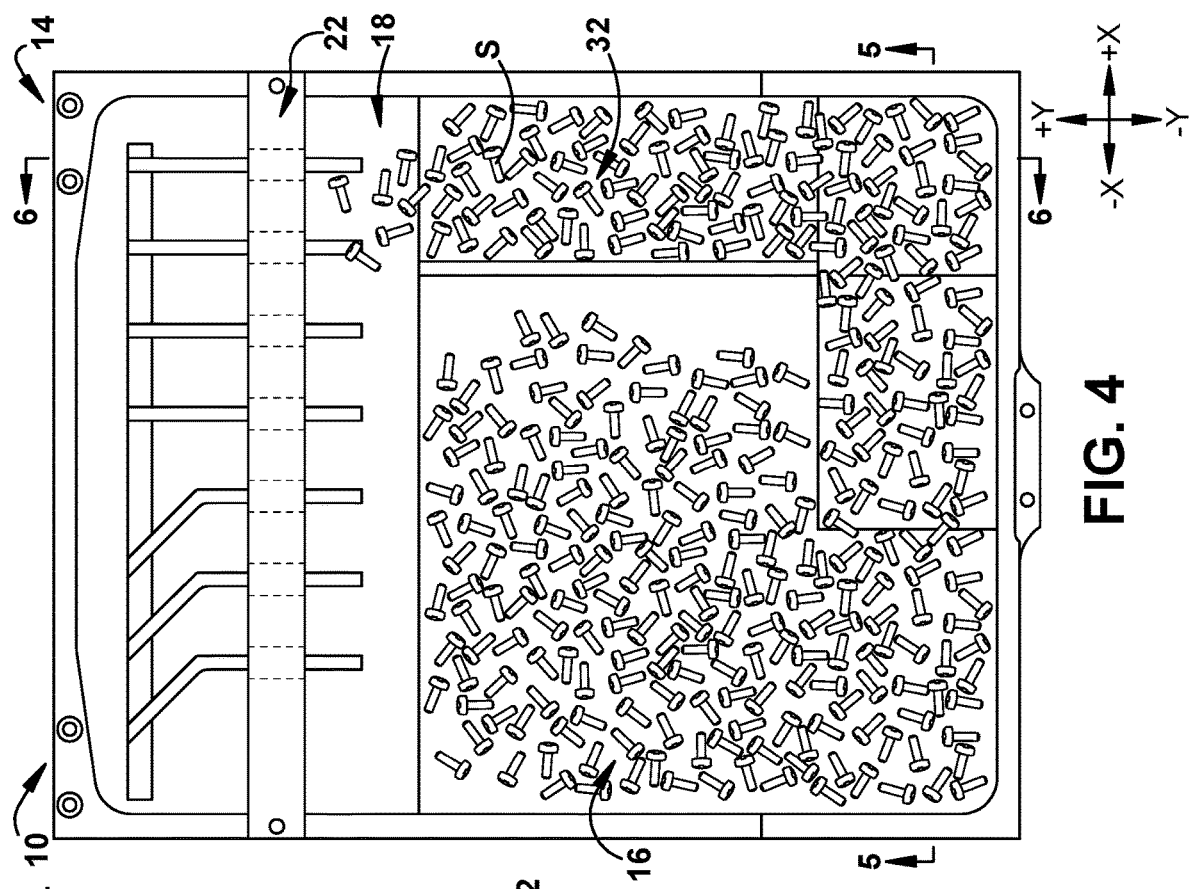
FIG. 4 is a top plan view of the system and tray in an exemplary state in which the objects move from the bulk region to a feed region of the tray.

Referring particularly to FIG. 4, the tray 14 may further include a feed region 32 that is interposed between the bulk region 16 and the orienting region 18 to facilitate movement of the objects therebetween. As shown, the feed region 32 may be configured as a channel that is separated from the bulk region 16, and is configured to allow the objects S to traverse in a downstream direction from the bulk region 16 to the orienting region 18. In exemplary embodiments, the feed region 32 may be relatively narrow compared to the bulk region 16 to thereby serve as a fixed restriction portion of the tray that may help to meter and/or regulate the flow of objects toward the orienting region 18. The feed region 32 also may include at least one separation wall 34 that extends upright to separate the feed region 32 from the bulk region 16 to prevent the objects from easily falling back into the bulk region.

As shown in the cross-sectional view of FIGS. 5 and 6, the feed region 32 may include one or more inclined surfaces 36, 37 that are inclined upwardly from the recessed bulk region 16 to the elevated orienting region 18. In addition, one or more level landings 38 may be provided between inclined surfaces 36 and 37, such as where the feed region 32 changes direction. As shown in FIG. 4, for example, the vibrational motion provided by the vibratory platform 28 is configured to impart sufficient motion to the objects S such that they can traverse up the inclined surface(s) 36, 37 to the orienting region 18. Such vibrational motion may be modified in the controller 30, for example, depending on the weight, shape and other factors of the objects. The inclined surface(s) 36, 37 also facilitate gravity feeding of the objects back toward the bulk region 16, such as when the vibrational motion is terminated.

Figure 7:
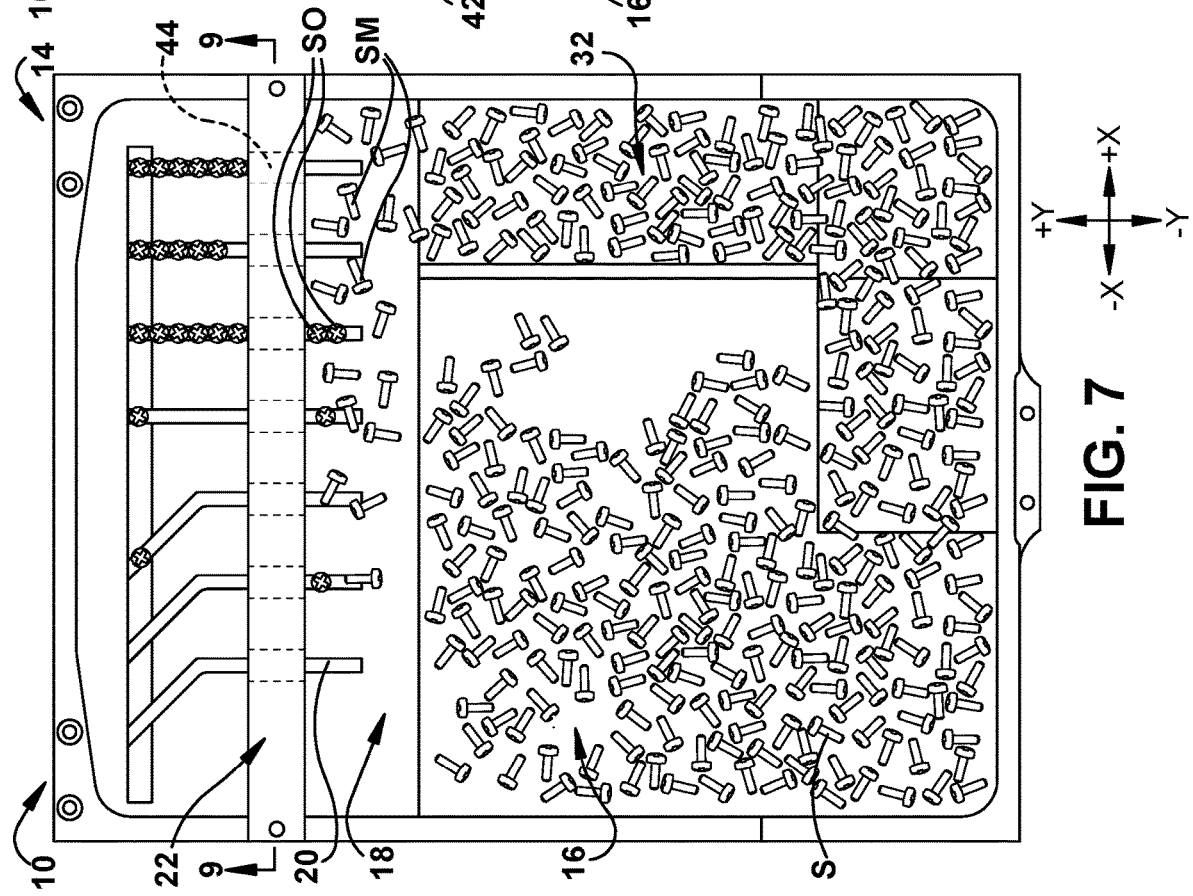
FIG. 7 is a top plan view of the system and tray in an exemplary state in which the objects move across an orienting region to orient in orienting slots, and in which at least some of the oriented objects move across an exemplary divider to segregate from misoriented objects.

Referring to FIG. 7, the objects S are shown exiting the feed region 32 and entering into the orienting region 18 of the tray. In the illustrated embodiment, the orienting region 18 extends in a transverse direction to the direction of the adjacent feed region 32. As such, the vibration profile provided by the vibratory platform 28 and/or the controller 30 may change the vibration direction to direct the objects S across the one or more orienting slots 20 in the orienting region 18 (e.g., direct the objects S in the –X direction in the illustrated embodiment).

As the objects S are passed over the orienting slots 20, the objects may fall into the slots 20 in a particular desired orientation, thereby orienting one or more of the objects within each of the one or more slots 20. It is understood that the particular orientation of the objects S in the orienting slots 20 may be based on the shape of the object S and the configuration of the slot 20. For example, in exemplary embodiments the width WS of each slot 20 (shown in FIG. 9, for example) is sufficient to allow only a single object to be oriented at each axial position of the slot, such that multiple ones of the objects are oriented and singulated in series in the slot 20 (as shown with oriented objects "SO" in FIG. 8, for example).

Figure 9:
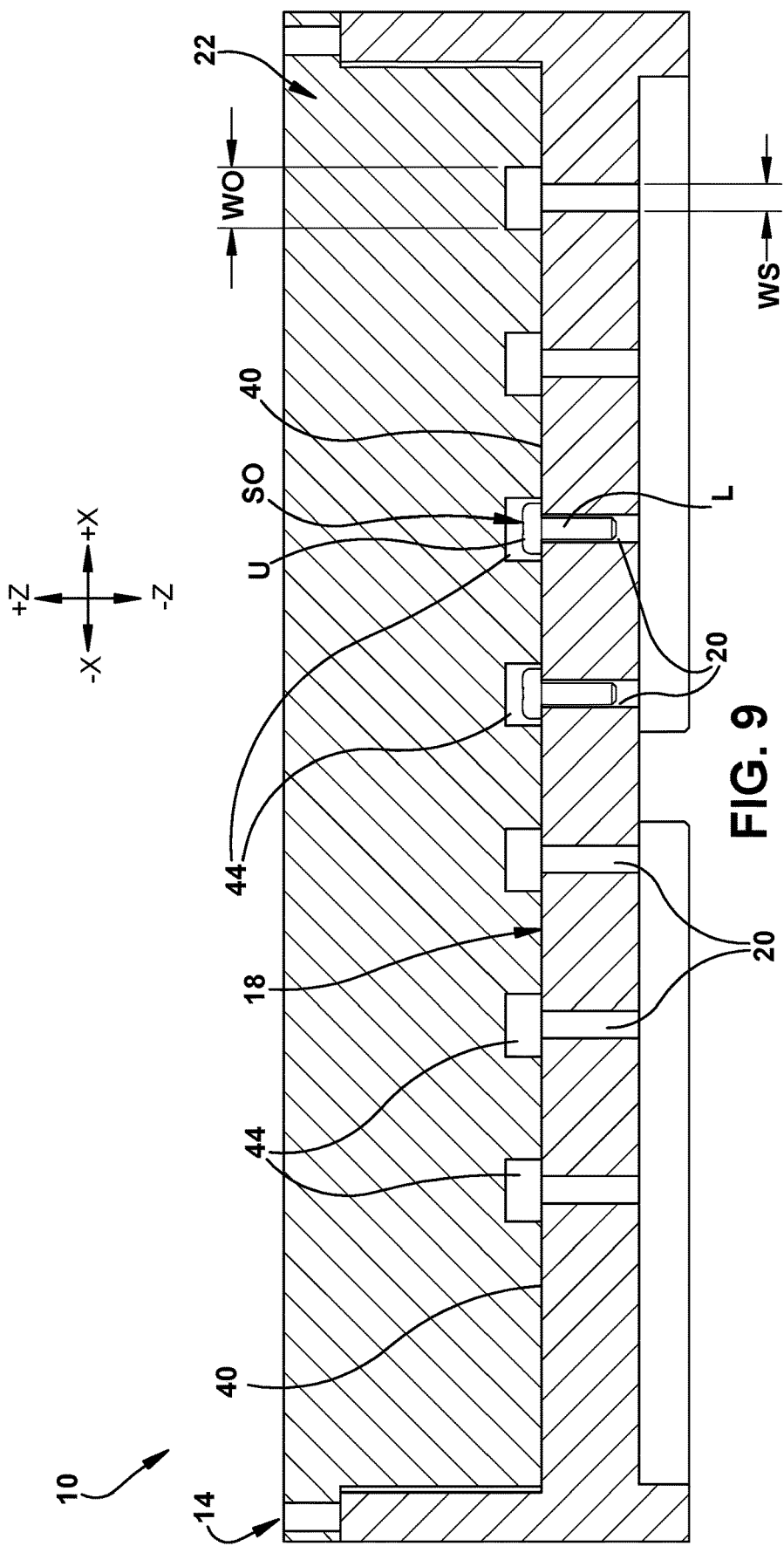
FIG. 9 is a cross-sectional front view taken about the line 9-9 in FIG. 8.

Referring particularly to the cross-sectional view in FIG. 9, the orienting region 18 includes a support surface 40 with the one or more slots 20 being recessed into the support surface 40. In this manner, the one or more slots 20 are configured to receive a lower portion L of the oriented object SO, and the support surface 40 is configured to support the upper portion U of the oriented object SO. In the illustrated embodiment, for example, the objects S are elongated fasteners having a wider head portion (e.g., upper portion U) and a narrower shank portion (e.g., lower portion L), and the width WS of the orienting slot 20 allows the fastener to be oriented in a desired direction with the head side up (as shown). The support surface 40 supports the upper portion U of the oriented object SO, and the narrower slot 20 guides the oriented object SO downstream through the divider 22 (discussed further below). It is understood that the particular configuration of the slots 20 and the types of objects S shown in the illustrated embodiment are exemplary, and other slot configurations and/or fasteners may be utilized with the exemplary tray 14 as would be understood by those having ordinary skill in the art.

Referring again to FIG. 7, it is noted that as the objects S are entering into the orienting region 18 from the feed region 32, the orienting region 18 may contain both oriented objects SO (in the slots 20) and misoriented objects SM (not in the slots 20). In some cases, because the oriented SO and misoriented SM objects are comingled together in the orienting region 18, the misoriented objects SM may create a crowded mass that blocks or obstructs the objects from being oriented in the slots 20 and/or from passing through the divider 22, thus creating a so-called log jam. As such, it may be desirable to clear at least some of the misoriented objects SM away from the orienting region 18 after a period of time.

Figure 8:
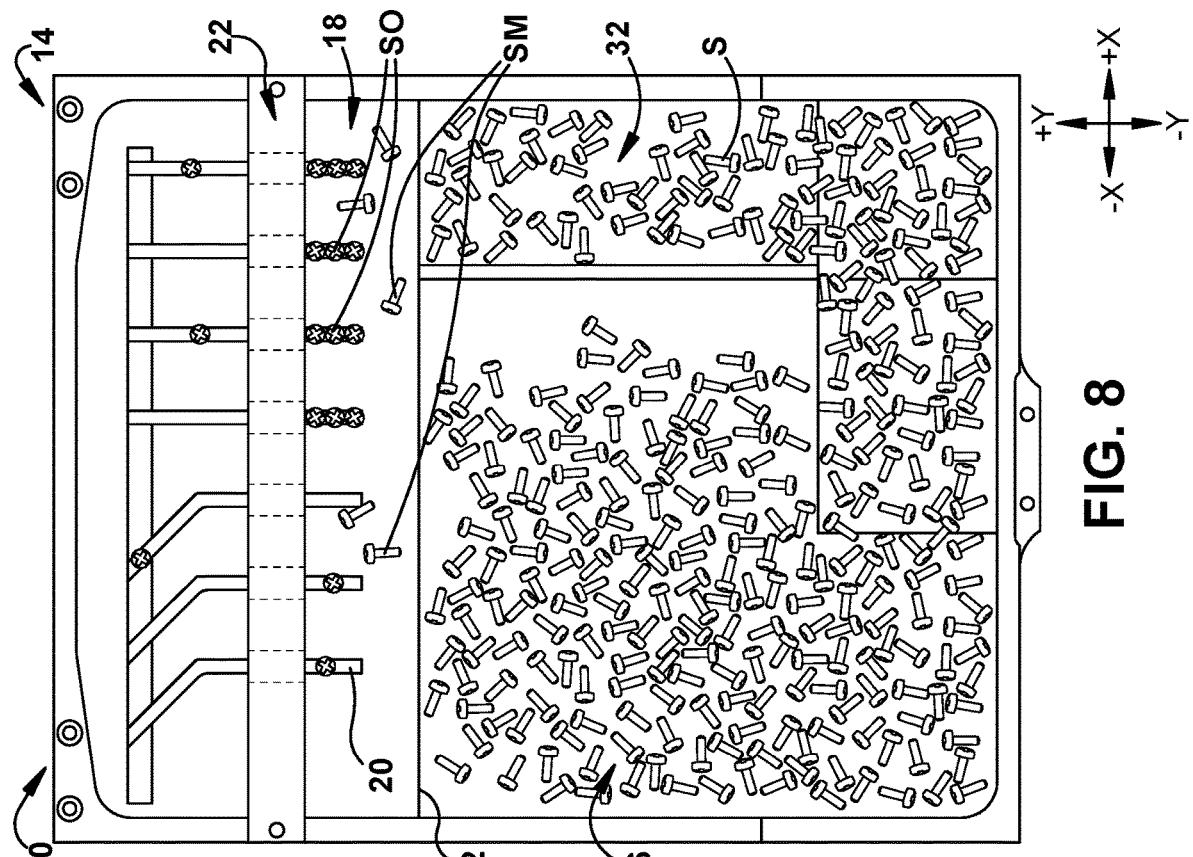
FIG. 8 is a top plan view of the system and tray in an exemplary state in which the direction of the objects is reversed away from the divider.

To facilitate such clearing away of at least some of the misoriented objects SM, the orienting region 18 may include a ledge portion 42 between the orienting slots 20 and the bulk region 16, which allows the misoriented objects SM that are not contained in the slots 20 to fall back into the recessed bulk region 16 for refeeding. For example, as shown in FIG. 8, the vibration direction is reversed (e.g., in the –Y direction in the illustration) after a predetermined period of time to cause the misoriented objects SM to pass over the ledge portion 42 and fall back into the bulk region 16. As shown, the reversal of the oriented objects SO in the slots 20 will reach the upstream end of the slot 20 and will be contained in the slot, while the misoriented objects SM fall off of the ledge portion 42. Alternatively or additionally, the vibration profile may direct the misoriented objects back through the feed region 32.

As noted above and shown in FIG. 7, because the orienting region 18 may contain both misoriented objects SM and oriented objects SO, the divider 22 is configured to segregate the oriented objects SO from the misoriented objects SM by allowing the oriented objects SO in the slots 20 to pass across the divider 22 into the singulating region 24, while confining the misoriented objects SM (not in the slots) to the orienting region 18. In exemplary embodiments, the divider 22 is formed as a wall or plate that is fixed in position, and which may be unitary with or attached to the tray 14. It is understood that the particular configuration of the divider 22 shown in the illustrated embodiment is exemplary, and other suitable dividers may be utilized as would be understood by those having ordinary skill in the art.

As shown in the illustrated embodiment with particular reference to FIGS. 7 and 9, the divider 22 includes one or more openings 44 that correspond with the one or more orienting slots 20. The openings 44 are configured to permit the objects which are oriented and singulated in series in the slots 20 to pass across the divider 22 into the singulating region 24. On the other hand, the portions of the divider 22 surrounding the openings 44 restrict the objects that are misoriented from passing into the singulating region 24. In this manner, the oriented and singulated objects SO are segregated on one side of the divider 22 from the misoriented objects SM on the opposite side of the divider.

As discussed above and shown in FIG. 9, the orienting slots 20 may be configured to receive the lower portion L of each of the oriented objects SO such that the upper portion U the objects protrudes above the support surface 40 having the slots 20. As such, the openings 44 of the divider 22 are configured to permit the respective upper portions U of the oriented objects SO to pass across the divider 22 while the lower portions L passes along the respective slots 20 extending under the divider 22. In this manner, the cross-sectional shape of the passage defined by the divider opening 44 and slot 20 generally corresponds with the cross-sectional shape of the object, although slightly enlarged to allow the object to pass therethrough. As shown in the illustrated embodiment, for example, the objects SO may be elongated with a head portion (e.g., upper portion U) and a shank portion e.g., lower portion L), such as a bolt, screw, or the like. As such, the openings 44 of the divider 22 may be configured with a width WO that is wider than the width WS of the slot 20 to correspond with the cross-sectional shape of the object so that the head portion (e.g., upper portion U) passes through the divider opening 44 while the shank portion (e.g., lower portion L) passes within the slot 20 below the opening 44. The height of the opening 44 above the upper support surface 40 also is higher than the height that the upper portion U (e.g., head) of the object protrudes above the support surface 40. In exemplary embodiments, the openings 44 of the divider 22 are completely enclosed by the other portions of the divider 22 and the upper support surface 40 of the tray to further mitigate the possibility of misoriented objects from passing across the divider 22.

Referring particularly to FIG. 10, the orienting slots 20 of the orienting region 18 extend downstream beyond the divider 22 into the singulating region 24 of the tray. In this manner, the oriented objects SO (e.g., heads up) and singulated in series (e.g., in line) may advance downstream of the divider 22 along the respective slots 20 toward a pick region 46 of the tray. In exemplary embodiments, one or more of the slots 20 may have a downstream segment 48 that is angled relative to an upstream segment of the slot 20. Such angling of the slots 20 may reduce movement of the oriented objects SO in the −Y direction, such as when the vibration direction is reversed to cause the misoriented objects SM to pass over the ledge portion 42 and fall back into the bulk region 16. For example, with the angled slots 48 the vibration direction may be actuated in the −X and −Y directions resulting in minimal displacement of the oriented objects SO in the slots 20 during return of the misoriented objects SM to the bulk region 16. Such angling also may help to minimize the singulated objects in the pick region 46 from being displaced. It is understood that although the tray 14 is shown with both straight and angled slots 20, some or all of the slots 20 may be angled, or some or all of the slots 20 may be straight.

In the illustrated embodiment, the pick region 46 is located at a downstream end portion of the slots 20, and is configured to facilitate picking of the objects SO at predetermined locations along the slots. To facilitate such positioning of the oriented and singulated objects SO at the predetermined locations along the slots 20, the pick region 46 may include one or more one-way stops 50 at the respective end portions of each slot 20. The one-way stops 50 are configured to allow the oriented objects SO to pass across the stop 50 in one direction (e.g., the +Y direction in the illustration), but to restrict the objects SO from moving back across the stop in the opposite direction (e.g., the −Y direction in the illustration).

Referring to FIG. 6, for example, the one-way stops 50 may be formed by a recessed portion 52 that extends transversely across the slots 20 in the pick region 46 of the tray. In such a configuration, the recessed portion 52 of the pick region 46 may have a support surface 54 at an elevation below the support surface 40 of the singulating region 24 and/or orienting region 18, thereby forming a ledge 56 that allows the objects to fall into the recessed portion 52. The ledge 56 serves as an upstream abutment that restricts the objects from movement in the reverse direction (e.g., to the higher elevation upstream of the ledge 56).

In exemplary embodiments, the pick region 46 may be a relatively narrow portion in the axial direction along the slots 20, and each slot 20 may have opposing abutments (e.g., the ledge 56 and the end 58 of the slot) that confine only a single object SS to the predetermined location along each slot 20. Such a configuration provides for improved presentation, singulation and orientation of the object SS in each slot 20 for picking by the operator or an automated device (e.g., robot), for example. In addition, as shown in FIG. 11, to further facilitate a clean pick of the singulated object SS, the other oriented objects SO next in line in each slot 20 may be moved upstream away from the respectively contained and singulated object(s) SS in the pick region 46 of each slot 20 (e.g., in the −Y direction in the illustration) to increase the clearance of the singulated object SS to be picked by the picking tool 60.

Figure 12:
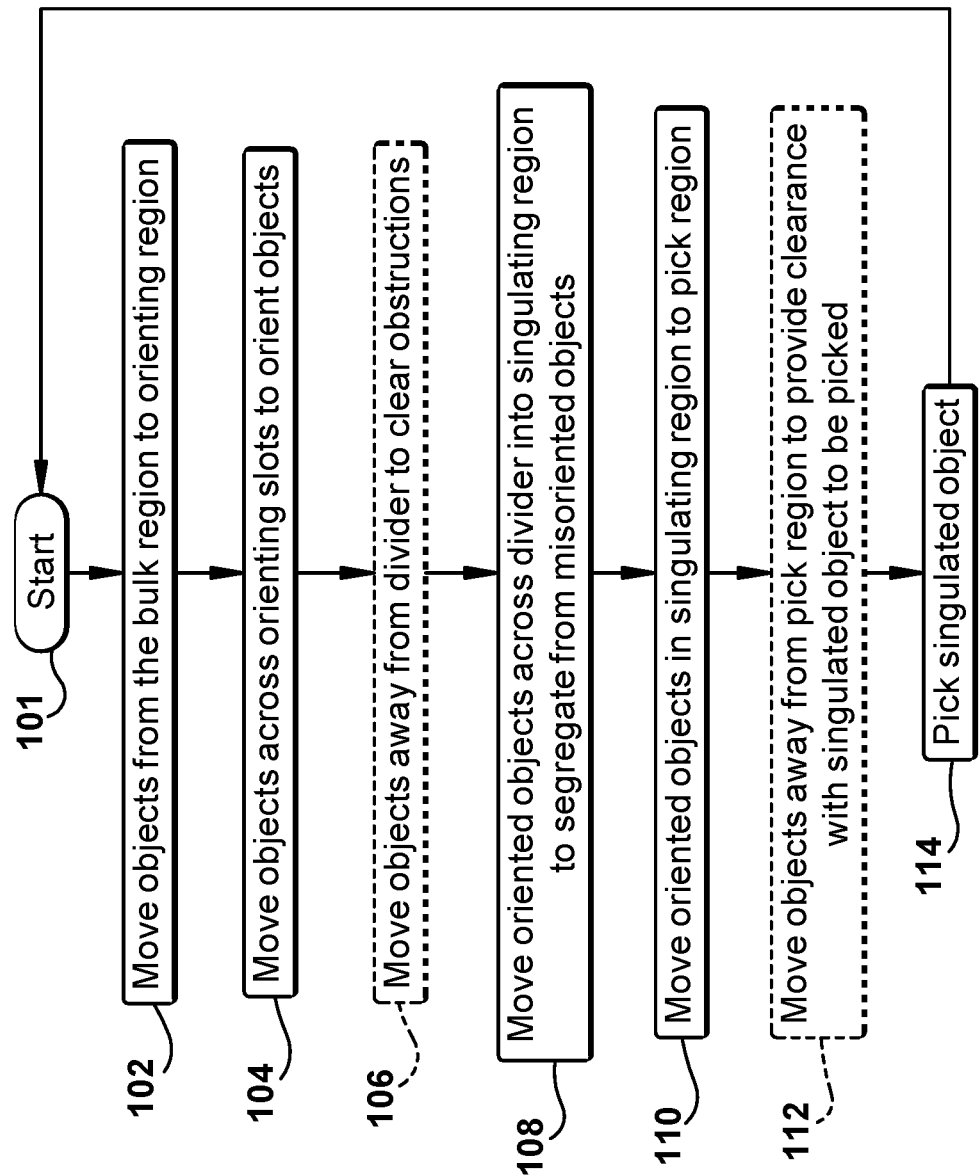
FIG. 12 is a flow diagram of an exemplary process according to an embodiment of the present invention.

Referring to the flowchart in FIG. 12, an exemplary method 100 of operating the exemplary flexible feeding system 10 is shown. At step 101, the process may begin by providing the exemplary tray 14 on the vibratory platform 12, such as with the objects S in bulk form (as illustrated in FIG. 3, for example).

At steps 102-114, the one or more actuator(s) (e.g., vibrators) of the vibratory platform 12 drive the objects S in particular directions along the tray 14. It is understood that the controller 30 of the flexible feeding system 10 may be configured to implement one or more of these steps of the process 100 with specifically programmed instructions for driving the actuator(s), as would be understood by those having ordinary skill in the art. It is furthermore understood that the method 100 may include other steps, may eliminate some of these steps, and/or may modify any of the steps, as may be desired for particular applications.

At step 102, the system 10 drives the actuator(s) in a direction that causes the objects to move from a bulk region of the tray toward an orienting region of the tray. As shown in FIGS. 3 and 4, for example, the actuator(s) cause movement of the objects to the right in the illustration (in the +X direction), and upwards in the illustration (in the +Y direction), such that the objects S move up the inclined feed region 32 of the tray.

At step 104, the system 10 drives the actuator(s) in a direction that causes the objects S to move across the orienting slots 20. As shown in FIG. 7, for example, the actuator(s) cause movement of the objects S to the left in the illustration (in the −X direction) and/or with some movement toward the divider 22 (in the +Y direction). As discussed above, such movement causes some of the objects SO to orient in the orienting slots 20.

Optionally at step 106, the system 10 drives the actuator(s) in a direction that causes the objects to move away from the divider, such as to clear obstructions. As shown in FIG. 8, for example, the actuator(s) cause movement of the objects downward in the illustration (in the −Y direction). As discussed above, such a step may involve causing the misoriented objects SM to be fed back into the bulk region 16, such as by falling off of the ledge 42 between the orienting slots 20 and bulk region 16.

At step 108, the system 10 drives the actuator(s) in a direction that causes the objects to move toward the divider 22, such as to segregate oriented objects SO from misoriented objects SM, and to advance the oriented objects SO downstream toward the pick region 46. As shown in FIG. 10, for example, the actuator(s) cause such movement upwards in the illustration (in the +Y direction).

At step 110, the system 10 continues to drive the actuator(s) in the direction that causes the oriented objects SO to move downstream within the slots 20 to the pick region 46 (e.g., upwards, or in the +Y direction, as shown in FIG. 10). The actuator(s) may be driven to continue such movement for a predetermined period of time.

Optionally at step 112, the system 10 drives the actuator(s) in a direction away from the pick region 46, such as to clear the oriented objects SO next in line away from the singulated object SS to be picked. As shown in FIG. 11, for example, the actuator(s) cause such movement downwards in the illustration (in the −Y direction).

At step 114, one of the objects singulated and oriented in the pick region is picked, such as by an operator or robot with a tool (as shown in FIG. 11, for example). The picking tool 60 may be a vacuum-enabled suction tool, a pneumatically-actuated gripper tool, a magnetic tool, or any other suitable tool for picking the object. In exemplary embodiments, the system 10 does not require vision guidance to locate and pick the objects because the objects are located at predetermined locations in the pick region 46, as discussed above. However, in some embodiments, a vision-guided system may be utilized to facilitate locating and picking the objects.

Optionally, prior to step 114, for automated systems, the system could use a sensor (laser, camera, inductive, etc.) to detect the presence of an object at the pick region 46 of a given slot 20 to instruct a robot to pick. Alternatively, the robot could blindly go to the location for picking the object via predetermined instructions, and the sensor could be on the pick tooling (vacuum switch, gripper stroke sensor, etc.) to verify that a part was picked. If no object is present to be picked, the robot could then move on to the next slot 20. If all slots 20 are empty, the system 10 could instruct an action, such as advancing the objects in the slots 20, or run a full recirculation of the objects from the bulk region 16 to the pick region 46.

As shown, after step 114, the process may then repeat to continue to feed the objects from the bulk region 16 to the pick region 46 for picking the objects from the tray 14. Alternatively, before looping to step 101 from step 114, the method may loop within step 114 without driving objects on the tray such that the objects in each slot 20 are picked in the pick region 46. Optionally, after all singulated objects SS are picked in the pick region 46 of the slots, the method could loop to step 110 to advance the already oriented objects SO in the slots 20 to the pick region 46 until no singulated objects remain, and then loop back to step 101.

In some embodiments, the system 10 may further include a sensor (such as a vision or weight sensor) that is configured to count the number of objects on the tray, and then provide instructions to feed additional objects into the bulk region 16 when the number of objects is below a predetermined number. It is understood that in some embodiments, such as the vision-guided system for counting objects, the bulk objects may be contained in an external hopper that feeds the orienting region 18 directly with the objects. In such an embodiment, the inclined feed region 32 and/or the bulk region 16 may be eliminated, or may be considered coextensive with the orienting region 18 having the orienting slots 20. Moreover, in such an embodiment, the controller 30 may be programmed with the same or different instructions (e.g., steps 102-114) to drive the actuator(s) to cause the objects to move across the divider 22 toward the pick region 46 of the tray. For example, the system may include sensors that monitors the locations of the objects on the tray and carries out one or more of the foregoing steps 102-114 in any sequence based upon a determination of the location of the objects on the tray.

For example, an exemplary method of operating a flexible feeding system that directly feeds objects to the orienting region 18 of the tray may include one or more of the steps of driving the actuator(s) to cause the objects in the orienting region to move across the orienting slots 20 to orient the objects. Then the system may drive the actuator(s) to cause the objects to advance across the divider 22 to the singulating region 24 in the manner described above, optionally with intermittent reversals of the driving direction to clear obstructions from the divider 22. Then the objects may be advanced to the pick region 46, such as across the one-way stop 50, and then reversed to move the other oriented objects next in line away from the singulated object SS, thereby allowing an obstruction-free pick.

An exemplary flexible feeding system including an exemplary tray that is configured to orient, segregate and singulate objects has been described herein. The system and/or tray improves the presentation of the objects to operators or automated systems, while also providing flexibility to change between different types of objects, thereby improving efficiency in manufacturing.

More particularly, in exemplary embodiments the flexible feeding system utilizes a programmable multi-axis vibratory platform operatively coupled to the unique tray, which includes one or more features that enhance the ability to orient and singulate the objects from bulk, advance the oriented objects to predetermined pick positions that are separated from misoriented objects for improved presentation to an operator or robot, and/or provide the ability for quick-changeover of the tray such as for use with different types of objects.

In exemplary embodiments, the system may have bulk object storage on the tray, or can be integrated with more conventional flex feeding features including a hopper and/or vision system to aid in the ability to isolate the objects into the predetermined pick positions.

In exemplary embodiments, the tray includes a divider that allows only properly oriented parts to pass into a region designated for singulated parts, thereby separating oriented parts from misoriented parts to improve picking from the tray.

In exemplary embodiments, the tray includes a recessed pick region toward the downstream end of each orienting slot, which is configured to capture the oriented object in the recessed area. The recessed pick region combined with a programmed vibration profile may accurately position the objects, such as by advancing them to the recess for picking, then reversing the singulated objects that are next in line to clear them away from the object(s) ready for picking. Such features may enable a clean pick from a predetermined location, thus reducing or eliminating the need for vision-guided robotics. The pick region also may be compatible with mechanical grippers or vacuum pick tooling. The system may be configured with a vibration profile that advances the objects toward the pick region, then reverses the direction to back other objects away from the object in the pick region, thereby adding additional clearance for pick.

The exemplary tray also may be removable from the vibratory platform for enabling quick-changeover of specific types of objects that are desired to be picked. Such a feature may allow the tray to be quickly changed, including the bulk region containing the specific objects, thereby reducing the possibility of mixed hardware. Such trays may have no moving parts, and thus may be supplied at low cost with little to no recurring engineering for new types of objects. In addition, such trays may be conducive to additive manufacturing techniques.

It is to be understood that terms such as "top," "bottom," "upper," "lower," "left," "right," "front," "rear," "forward," "rearward," and the like as used herein may refer to an arbitrary frame of reference, rather than to the ordinary gravitational frame of reference.

As used herein an "operable connection," or a connection by which entities are "operably connected," is one in which the entities are connected in such a way that the entities may perform as intended. An operable connection may be a direct connection or an indirect connection in which an intermediate entity or entities cooperate or otherwise are part of the connection or are in between the operably connected entities. An "operable connection," or a connection by which entities are "operably connected," also may be one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

It is understood that embodiments of the subject matter described in this specification can be implemented in combination with digital electronic circuitry, controllers, processors, computer software, firmware, and/or hardware. For example, embodiments may be implemented in a flexible feeding system that uses one or more modules of computer program instructions encoded on a non-transitory computer-readable medium for execution by, or to control the operation of, data processing apparatus.

In the flow diagram(s), blocks may denote "processing blocks" that may be implemented with logic. The processing blocks may represent a method step or an apparatus element for performing the method step. A flow diagram does not depict syntax for any particular programming language, methodology, or style (e.g., procedural, object-oriented). Rather, a flow diagram illustrates functional information one skilled in the art may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown or that blocks may be combined or separated into multiple components.

"Logic," as used herein, includes but is not limited to hardware, firmware, software or combinations of each to perform a function(s) or an action(s), or to cause a function or action from another logic, method, or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

Algorithmic descriptions and representations used herein are the means used by those skilled in the art to convey the substance of their work to others. An algorithm or method is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like. It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities.

Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities. It will be appreciated that the processes may be implemented using various programming approaches like machine language, procedural, object oriented or artificial intelligence techniques. In one example, methodologies are implemented as processor executable instructions or operations provided on a computer-readable medium. Thus, in one example, a computer-readable medium may store processor executable instructions operable to perform a method. The computer-readable medium may be a hard-drive, a machine-readable storage device, a memory device, or a combination of one or more of them.

The controller may include all apparatus, devices, and machines for processing data, including by way of example a programmable processor, a computer, or multiple processors or computers. The controller may include, in addition to hardware, code that creates an execution environment for the computer program in question. The computer program (also referred to as software or code), may be deployed in any form, including as a stand-alone program or as a module, component, subroutine, or other unit suitable for use in a computing environment. The computer program may be deployed to be executed on one computer or on multiple computers that are located at one site or distributed across multiple sites and interconnected by a communication network. The processor may include all apparatus, devices, and machines suitable for the execution of a computer program, which may include, by way of example, both general and special purpose microprocessors, and any one or more processors of any kind of digital computer. Generally, the processor will receive instructions and data from a read-only memory or a random access memory or both. The computer may include, or be operatively coupled to receive data from or transfer data to, or both, one or more mass storage devices for storing data. Devices suitable for storing computer program instructions and data include all forms of non-volatile memory, media and memory devices, including by way of example semiconductor memory devices. The processor and the memory can be supplemented by, or incorporated in, special purpose logic circuitry.

To provide for interaction with a user, embodiments may be implemented using a computer having a display device and an input device. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. Embodiments may include a computing system that includes a back-end component (e.g., as a data server), or that includes a middleware component (e.g., an application server), or that includes a front-end component (e.g., a client computer having a graphical user interface through which a user can interact with an implementation of the subject matter described is this specification), or any combination of one or more such back-end, middleware, or front-end components. The components of the system can be interconnected by any form or medium of digital data communication.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A flexible feeding system comprising:
    a multi-directional vibratory platform;
    a tray operatively coupled to the vibratory platform, the tray comprising:
        a bulk region configured to contain a plurality of objects in bulk form;
        an orienting region having one or more orienting slots configured to orient one or more of the objects within each of the one or more slots; and
        a divider that separates the orienting region from a singulating region of the tray;
    wherein the one or more orienting slots extend across the divider from the orienting region into the singulating region of the tray; and
    wherein the divider includes one or more openings that correspond with the one or more orienting slots, the one or more openings being configured to permit the objects which are oriented and singulated in series in the one or more orienting slots to pass across the divider into the singulating region, and the divider being configured to restrict the objects which are misoriented in the orienting region from passing across the divider into the singulating region.

2. The flexible feeding system according to claim 1, wherein the one or more orienting slots are configured to receive a lower portion of each of the objects when oriented, such that an upper portion of each of the objects which are oriented protrudes above the one or more orienting slots; and
    wherein each of the one or more openings of the divider are configured to permit the upper portions of the objects which are oriented in the one or more orienting slots to pass across the divider.

3. The flexible feeding system according to claim 2, wherein the one or more orienting slots are formed as recesses in a support surface of the tray, the one or more orienting slots being configured to receive the lower portion of each of the objects which are oriented, and the support surface being configured to support the upper portion of each of the objects which are oriented.

4. The flexible feeding system according to claim 2, wherein a width of each of the one or more openings is wider than a width of each the corresponding one or more orienting slots.

5. The flexible feeding system according to claim 1, wherein the divider is fixed in position relative to the orienting region.

6. The flexible feeding system according to claim 1, wherein the bulk region is recessed in the tray at a lower elevation than the orienting region.

7. The flexible feeding system according to claim 6, wherein the tray further includes a feed region connecting the bulk region to the orienting region, the feed region being upwardly inclined from the bulk region to the orienting region.

8. The flexible feeding system according to claim 6, wherein the orienting region includes a ledge between the one or more orienting slots and the bulk region, such the objects which are misoriented can move toward the bulk region and pass over the ledge to fall into the bulk region.

9. The flexible feeding system according to claim 1,
    wherein the tray further includes a pick region downstream of the singulating region;
    wherein the one or more orienting slots extend through the singulating region to the pick region; and
    wherein the pick region includes one or more one-way stops that correspond with each of the one or more orienting slots, the one or more one-way stops being configured to permit the objects which are oriented in the one or more orienting slots to pass across the respective one-way stops in a downstream direction, and to restrict said objects from passing back across the one-way stop in an opposite upstream direction.

10. The flexible feeding system according to claim 9, wherein the pick region includes one or more recessed areas that correspond with each of the one or more orienting slots, the one or more recessed areas being at an elevation below an elevation of the singulating region, and wherein the one or more recessed areas form respective one or more ledges that define the one or more one-way stops; and
    wherein each of the one or more recessed areas has an axial length along each of the one or more slots that is sufficient to contain only a single one of the objects in each of the one or more slots.

11. The flexible feeding system according to claim 1,
    wherein the tray is removable from the vibratory platform; and
    wherein the tray has a fastener configured to be received in a receiver of the vibratory platform to secure the tray to the vibratory platform; or the tray has a receiver configured to receive a fastener of the vibratory platform to secure the tray to the vibratory platform.

12. The flexible feeding system according to claim 1, wherein the multi-directional vibratory platform is operatively coupled to a controller that is configured to drive one or more actuators of the vibratory platform that causes movement of the objects from the bulk region downstream to the orienting region and across the divider into the singulating region.

13. A tray for being operatively coupled to a vibratory platform of a flexible feeding system, the tray comprising:
an orienting region configured to receive a plurality of unoriented objects, the orienting region having one or more orienting slots configured to orient one or more of the unoriented objects within each of the one or more slots;
a divider that separates the orienting region from a singulating region of the tray;
wherein the one or more orienting slots extend beyond the divider from the orienting region into the singulating region of the tray; and
wherein the divider includes one or more openings that correspond with the one or more orienting slots, the one or more openings being configured to permit the objects which are oriented in the one or more slots to pass across the divider into the singulating region, and the divider being configured to restrict the objects which are unoriented in the orienting region from passing across the divider into the singulating region.

14. The tray according to claim 13, wherein the one or more orienting slots are configured to orient and singulate the objects in series within each of the one or more orienting slots, and are configured to guide the objects which are oriented and singulated in series along each of the one or more orienting slots across the divider into the singulating region.

15. The tray according to claim 13,
wherein the tray further includes a pick region downstream of the singulating region, and the one or more orienting slots extend through the singulating region to the pick region; and
wherein the pick region includes one or more recessed areas that correspond with each of the one or more orienting slots, each of the one or more recessed areas forming opposing abutments along each of the one or more orienting slots, the respective opposing abutments being configured to contain only a single one of the objects in each of the one or more orienting slots.

* * * * *